(12) United States Patent
Haeusler et al.

(10) Patent No.: US 7,532,333 B2
(45) Date of Patent: May 12, 2009

(54) METHOD AND APPARATUS FOR DETERMINING THE SHAPE AND THE LOCAL SURFACE NORMALS OF SPECULAR SURFACES

(75) Inventors: Gerd Haeusler, Erlangen (DE); Markus Knauer, Erlangen (DE); Ralf Lampalzer, Rueckersdorf (DE)

(73) Assignees: 3D-Shape GmbH, Erlangen (DE); The University of Erlangen, Erlangen (DE)

( * ) Notice: Subject to any disclaimer, the term of this patent is extended or adjusted under 35 U.S.C. 154(b) by 582 days.

(21) Appl. No.: 11/113,755

(22) Filed: Apr. 25, 2005

(65) Prior Publication Data

US 2005/0238237 A1     Oct. 27, 2005

(30) Foreign Application Priority Data

Apr. 23, 2004     (DE)     ........................ 10 2004 020 419

(51) Int. Cl.
*G01B 11/24*     (2006.01)
(52) U.S. Cl. ........................ 356/612; 356/601; 356/603

(58) Field of Classification Search ................. None
See application file for complete search history.

(56) References Cited

U.S. PATENT DOCUMENTS

| | | | |
|---|---|---|---|
| 6,556,783 B1* | 4/2003 | Gelphman | 356/610 |
| 6,590,669 B1* | 7/2003 | Wagner | 356/601 |
| 6,690,474 B1* | 2/2004 | Shirley | 356/603 |
| 7,075,662 B2* | 7/2006 | Hallerman et al. | 356/604 |

* cited by examiner

*Primary Examiner*—Gregory J Toatley, Jr.
*Assistant Examiner*—Juan D Valentin
(74) *Attorney, Agent, or Firm*—Laurence A. Greenberg LLP; Werner H. Stemer; Ralph E. Locher

(57) ABSTRACT

A method teaches how to measure—even strongly curved—specular surfaces with an apparatus that measures a shape as well as local surface normals absolutely. This is achieved by the observation and evaluation of patterns that are reflected at the surface. The reflected patterns are observed from different directions. The evaluation is done by termination of those locations in space, where the surface normals that are observed from different directions, have at least deviations against each other.

29 Claims, 3 Drawing Sheets

METHOD AND APPARATUS FOR DETERMINING THE SHAPE AND THE LOCAL SURFACE NORMALS OF SPECULAR SURFACES

BACKGROUND OF THE INVENTION

Field of the Invention

The patent describes a method and an apparatus for whole area measurement even of strongly curved, specular surfaces. The method can be used to measure quickly both the local height and the local inclination of the surface.

There is an increasing need for geometric measurement of specular surfaces. Such surfaces are, for example, optically active areas such as lens surfaces and mirror surfaces. There is great need, in particular, for the measurement of aspheric lenses, also including spectacle lenses. Windshield panes or window glass are also optical surfaces. Further examples of specular surfaces are wafers, hard disks, or else painted, polished or glazed molded parts such as, for example, automobile bodies.

The measurement of such free-form surfaces is very difficult, particularly when high precision is required such as, for example, in the case of the optically active surfaces. It is not possible here to make direct use of the standard optical methods such as interferometry. Another principle, "deflectometry" is gaining use. The deflection of the light beams reflected by the object is measured with the aid of deflectometric methods.

Known deflectometric methods are the raster reflection method and its developments as taught in the references by R. Ritter and R. Hahn, entitled "Contribution To Analysis Of The Reflection Grating Method", Optics and Lasers in Engineering 4(1), pp. 13-24, 1983, by D. Pérard and J. Beyerer, entitled "Three-Dimensional Measurement Of Specular Free-Form Surfaces With A Structured Lighting Reflection Technique", in Three-Dimensional Imaging and Laser-based Systems for Metrology and Inspection III, Proc. SPIE 3204, pp. 74 80, 1997, and by S. Kammel, entitled "Deflectometry For Quality Control Of Specular Surfaces," Technisches Messen tm 70, pp. 193-8, 2003. Patterns are projected onto a screen in these methods. The patterns are reflected by the specular object and recorded with the aid of a camera. The patterns appear distorted depending on the shape of the object. The distortion is mostly determined by a series of displaced patterns whose reflected images are recorded and suitably evaluated. If a sinusoidal pattern is advantageously used as the pattern, the known phase shift method is used for evaluation (determination of the phase) as taught in Published, non-prosecuted German patent Application DE 199 44 354 A1. In this process, sinusoidal patterns having various frequencies are produced in a way that is multiply displaced, possibly also rotated, and observed. There are also methods that require only a single sinusoidal pattern of high frequency and that determine the local phase by neighborhood relationships.

SUMMARY OF THE INVENTION

It is accordingly an object of the invention to provide a method and an apparatus for determining the shape and the local surface normals of specular surfaces which overcome the above-mentioned disadvantages of the prior art methods and devices of this general type.

With the foregoing and other objects in view there is provided, in accordance with the invention, a method for determining a shape and local surface normals of specular surfaces by observing patterns reflected from a surface. The method includes recording images of a pattern reflected from the surface from at least two observation directions, and determining for arbitrary spatial points from at least two of the images, associated potential surface normals with an aid of reflection law for a surface point potentially situated there. An actual shape and actual local surface normals are determined from a set of spatial points thus treated, at which potential surface normals correspond except for measuring errors.

In accordance with an added mode of the invention, there is the step of performing the recording step sequentially between the observation directions.

In accordance with an additional mode of the invention, there is the step of performing the recording step simultaneously from a number of the observation directions.

In accordance with a further mode of the invention, there is the step of recording a number of images of various patterns from each of the observation directions and determining the associated potential surface normals therefrom.

In accordance with another feature of the invention, a determination of the potential surface normals begins with the arbitrary spatial points from a small region of space until a first surface point is found, and in that an attempt is made to find further surface points iteratively with an aid of a surface normal, starting from the first surface point.

In accordance with another added mode of the invention, there is the step of performing a determination of the further surface points by interpolation over a number of spatial points.

In accordance with a further added mode of the invention, there is the step of selecting a number and an orientation of the observation directions such that images of the patterns reflected can be recorded in various subareas of the surface from in each case at least two observation directions.

In accordance with another further mode of the invention, there is the step of carrying out a number of measurements successively in which the surface is moved such that subareas of the surface can be measured successively.

In accordance with a concomitant mode of the invention, there is the step of combining measurements of a number of the subareas of the surface to form a common measured surface.

Other features which are considered as characteristic for the invention are set forth in the appended claims.

Although the invention is illustrated and described herein as embodied in a method and an apparatus for determining the shape and the local surface normals of specular surfaces, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The deflection of light beams reflected by an object is measured with the aid of deflectometric methods. The object itself is not visible, all that can be detected is the optical effect. In reflection, a combination of height and surface normal of the surface to be measured is measured. It follows that no absolute measurement is possible.

Figure 1:
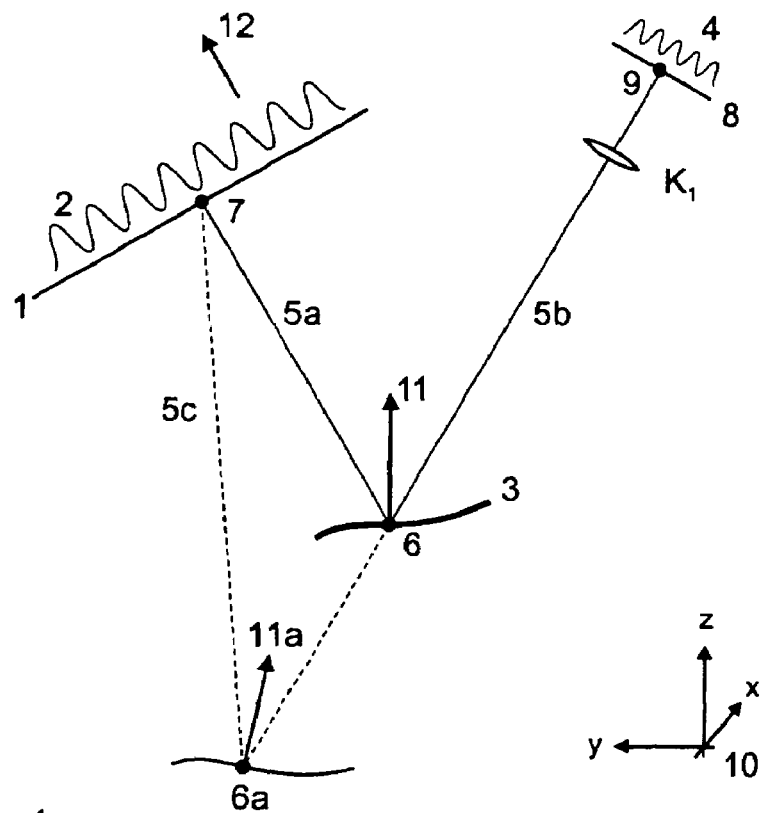
FIG. 1 is a diagrammatic illustration for explaining the method according to the invention for measuring the deflection of light beams reflected by an object.

This is explained in FIG. 1. A pattern 2 is produced on a screen or luminous display 1. A camera $K_1$ images the pattern 2 via the specular surface 3 of the object. An image 4 of the reflected pattern is produced in an image plane 8 of the camera. Drawn in as an example for the imaging is a beam 5a and 5b that is reflected at a location 6 of the surface 3. The beam, which is emitted by the screen at a point 7, is imaged onto a location 9 in the image plane 8 of the camera.

When use is made of unique patterns (in the case of which each point can be uniquely identified), it is possible to determine for each recorded image point (the point 9 in the example) which point of the pattern 2 produced has been imaged (the point 7 in the example). Suitable patterns or pattern sequences are, for example, Gray code, linear, punctiform patterns or the sinusoidal patterns addressed above. Combinations of various types of patterns can also be used.

In a calibrated system, the position of screen 1 or pattern 2 and camera $K_1$ is known in the space of the coordinate system 10. The position of point 7 and point 9, from which the beam 5b can be calculated, is therefore also known.

Nevertheless, it is not possible to determine the position of the point 6, or a surface normal 11 at the point 6. The reason for this is that the object surface itself is, after all, not visible, and that another position 6a of the object point with a suitable surface normal 11a would likewise image the point 7 onto the point 9. It follows that the cases indicated by way of example cannot be distinguished. If the position of the location 6 of the surface were known, the normal 11 at this point could be determined in absolute terms with the aid of the reflection law: the normal 11 is the angle bisector at the point 6 of the triangle that is formed by the point 7 in the pattern, the point 9 in the image of the reflected pattern, and the surface point 6.

The information on the local height, in other words on the shape, cannot be determined uniquely. Without the local height, however, it is also impossible to make absolute measurements of the inclination. This is of less importance if the aim is only to detect local "waves" on the object in qualitative terms, for example dents on a body. It is also possible to take relative measurements against a reference.

However, absolute measurement is necessary for many tasks. For example, this is so for the measurement of spectacle lenses where, furthermore, a very high accuracy is required.

Methods are known that solve this grave problem. In the reference by M. Petz und R. Tutsch, entitled "Measurement Of Optically Effective Surfaces By Imaging Of Gratings," In Optical Measurement Systems for Industrial Inspection II, Munich, Germany, Proc. SPIE 5144, pp. 288-94, 2003, the screen is displaced in direction 12, for example, and various images of the reflected pattern are therefore recorded. It is possible thereby to determine the beam 5a, and thus also the point 6. The method has the disadvantage, inter alia, that a mechanical displacement is technically complicated and slow.

Another solution is described in German patent DE 100 14 964 C2. The pattern is imaged to infinity by a collimation lens between the screen and the object. This defines a direction for each point on the screen. In the example of FIG. 1, such a lens permits only the direction 5a for beams coming from the location 7, for example. A direction 5c from the point 7 would not be possible. The method likewise has a few disadvantages such as strongly curved objects require a large angular region for the incident beams. The exceptionally high requirements placed on the image angle at the required collimation lens are virtually impossible to fulfill in practice. A further, grave disadvantage is that although the normal can be determined, local height cannot be determined in principle, since only the direction of the beam 5a, but not the location are determined.

The disadvantages of the known methods are removed as follows in accordance with the invention: a description is given of how it is possible to determine the local height (the "shape") and also, with high accuracy, the surface normals in the case of specular objects in a quick and technically uncomplicated way.

Figure 2:
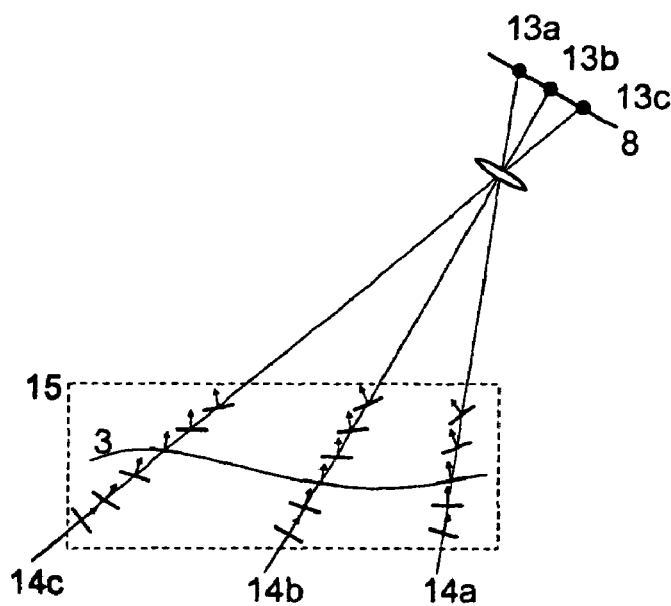
FIG. 2 is a diagrammatic illustration of multiple lines of sight that are defined by a recorded image.

In the case of a calibrated system, it is possible to determine from the recorded images the normal that the surface would have if the reflection had taken place at the location 6, 6a or at any other point of the line of sight 5b. This can also be achieved for all other lines of sight that are defined by the recorded image, as is shown in FIG. 2: every image point, for example 13a, 13b, 13c defines a line of sight 14a, 14b, 14c. The potential normals $n_1(x, y, z)$ can be determined in the entire measuring space 15 for each potential surface point (x, y, z) from the images recorded by the camera $K_1$. In FIG. 2, the object 3 is situated as depicted. However, this position is not yet known, rather it is to be determined.

Figure 3:
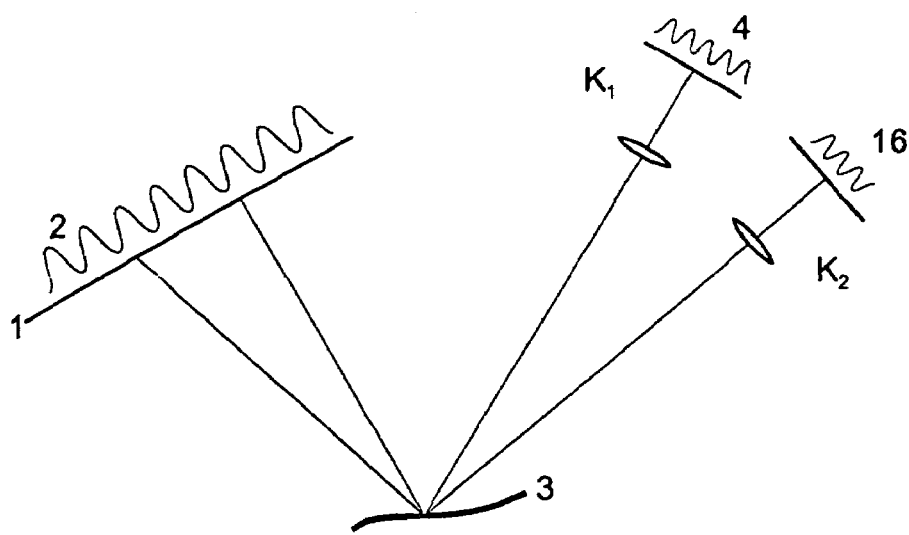
FIG. 3 is a diagrammatic illustration for explaining the method according to the invention for measuring the deflection of light beams reflected by an object using two cameras.
Figure 4:
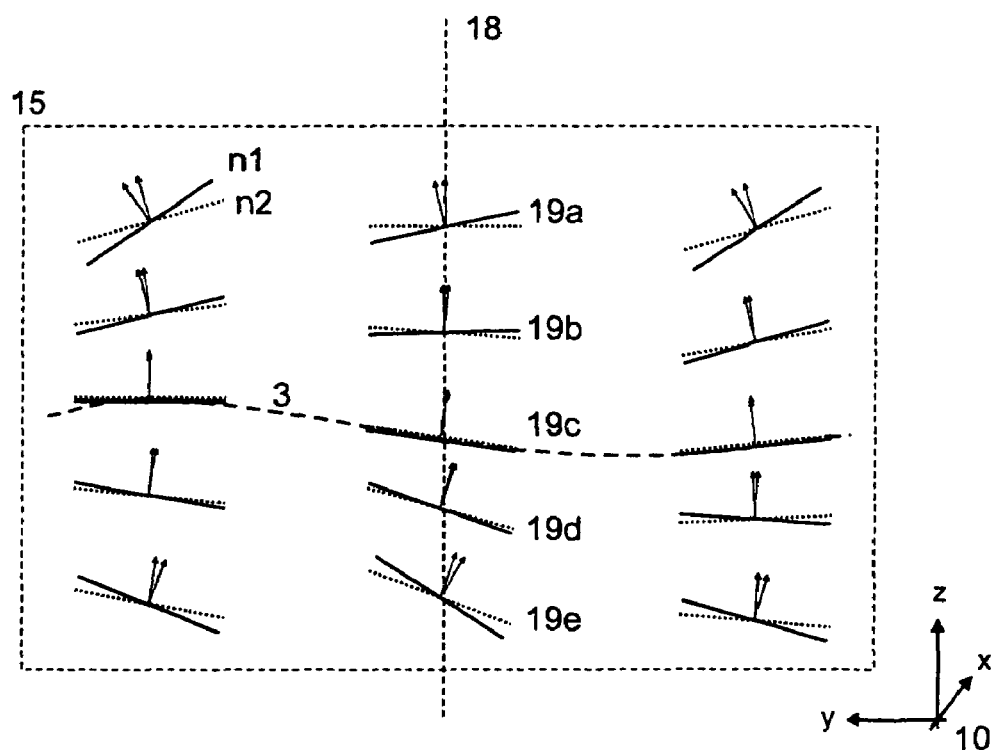
FIG. 4 is diagrammatic illustration for showing a recordation of potential normals.
Figure 5:
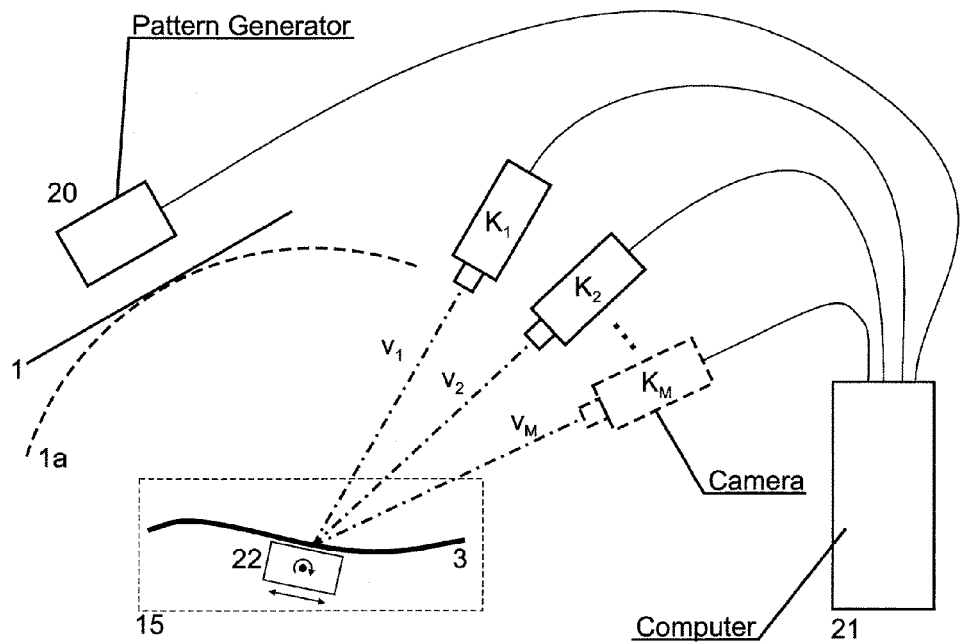
FIG. 5 is an illustration of an apparatus for carrying out the method according to the invention.
Figure 6:
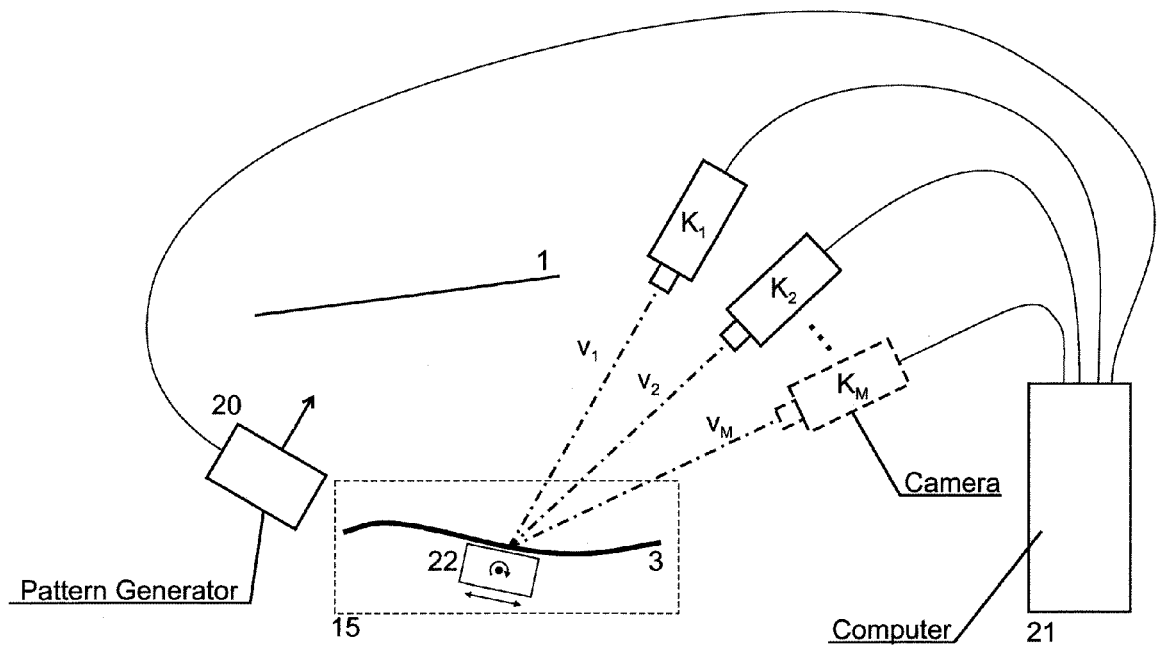
FIG. 6 is a similar illustration of the apparatus with a screen that is not backlit.

This is rendered possible, according to the invention, by the method illustrated in FIGS. 3, 4 and 5: a second calibrated camera $K_2$ likewise records the reflected patterns. These patterns 16 have a different configuration, because the viewing angle is a different one.

FIG. 4 outlines the result for a given object 3 in the measuring space 15. The potential normals $n_2(x, y, z)$ are likewise determined for all points (x, y, z) from the images on the camera $K_2$. The normals $n_1$ differ from the normals $n_2$ in a large zone of the measuring space. However, at the locations $(x_i, y_i, z_i)$, at which the surface was actually situated during the measurement, it holds that: $n_1(x_i, y_i, z_i)=n_2(x_i, y_i, z_i)$. Thus, if the locations $(x_i, y_i, z_i)$ can be determined, then both the local height ("shape") and the actual surface normals are found.

A stereo method using two cameras is likewise described in the reference by A. C. Sanderson, L. E. Weiss and S. K. Nayar, entitled "Structured Highlight Inspection Of Specular Surfaces," IEEE Transactions on Pattern Analysis and machine intelligence 10(1), pp. 44-55, 1988. However, with this method it is not the reflected images of surface patterns that are recorded, but the reflected images of N shining points. The method is decidedly weak. For it to function, it is necessary for both cameras each to observe a reflection at the same surface point. However, this will only be the case by chance for a pattern of discretely shining points.

Measuring errors occur in a real measurement. Consequently, the normals $n_1$ and $n_2$ are generally not exactly equal. In this case, it is possible to look for points in the measuring space at which the normals have the least deviation from one another. When searching for the locations ($x_i$, $y_i$, $z_i$), it is possible to use a priori information such as the size of the object or neighborhood relationships. For example, it is possible to select on a straight line 18 through the measuring space a finite number of raster points 19a, 19b, 19c . . . at which the potential normals are calculated. If the point 19c with the least difference between the calculated normals has been found, it is possible to look for further surface points in the surroundings of this point. Neighboring points are situated approximately in the tangential plane that is defined by the point found and the surface normal.

Since the raster points found are usually not situated exactly at the location at which the surface actually was, it is expedient to interpolate between the raster points. However, the method also functions on discontinuous surfaces, since the measuring space can be searched through even without neighborhood relationships. For example, it is possible to search through the entire measuring space on many straight lines that are parallel to the straight line 18.

The accuracy of the method can be raised by observing not only from two directions, but also from several directions using several cameras $K_1, K_2 \ldots K_M$. An additional advantage of several cameras results in the fact that strongly curved surfaces generally cannot be covered completely by one camera. Using several cameras, it is possible to ensure that one sub-region of the surface can be measured using in each case two or more cameras, and another sub-region using other cameras. The measured data obtained can be used to determine further parameters of the surface with high accuracy. Such parameters are, for example, the curvature (mean, minimum, maximum curvature and astigmatism), the surface torsion or derivatives of higher order.

FIG. 5 outlines an apparatus according to the invention with the aid of which the above-described method can be carried out. The cameras $K_1, K_2 \ldots K_M$ are mounted such that they image the patterns reflected at the object from various directions $v_1, v_2 \ldots v_M$. It is preferred to use electronic cameras (CCD, CMOS) whose images can be processed electronically. In this case, a large angle between the observation directions leads to a more accurate determination of the surface 3. It is also conceivable to use a single camera and to use it to take measurements sequentially from different locations, or to move several cameras.

It is expedient for the purpose of producing patterns on the screen 1 not to use a fixed system, but an electronically controllable system 20. It is possible here, for example, to use a controllable slide or video projector (for example with an LCD, LCOS, DMD modulator) together with a ground glass screen. However, it is also possible to make direct use of a display or other controllable pattern generator instead of the screen 1. It is expedient to synchronize the production of patterns and the recording of images. A very cost-effective solution is to use fixed patterns that are, for example, displaced between the recordings. The fixed patterns can either be projected onto the screen, or else be applied directly to the screen. It is possible either to illuminate the screen by reflection and observe it, or to illuminate it in transmitted light and observe it. It is also possible to use a cambered screen 1a with the aid of which strongly curved objects can be measured.

All unique patterns or pattern combinations can be used, in principle. However, as described in published, non-prosecuted German patent application DE 19944354 A1, it is advantageous to use patterns with a sinusoidal intensity profile. These patterns yield the lowest measurement uncertainty by comparison with other patterns.

The patterns can be driven, and the processing of the recorded patterns, can be carried out centrally using a computer 21. Ideally, the production of the patterns with the aid of the apparatus 20 and the recording with the cameras $K_1 \ldots K_M$ are synchronized in order to be able to measure as quickly as possible.

In the case of the method described, the measurement object can be positioned freely in the measuring space 15. The use of the apparatus is therefore very variable, since the objects need not be clamped in to the apparatus, nor be moved during the measurement. The apparatus can be used, for example, on a production line. On the other hand, it is also possible to use an object holder 22 with the aid of which the object can be displaced, rotated and tilted. This is helpful in the case of very curved surfaces. The surface of the object can then be measured successively from various directions. These partial measurements can optionally be combined to form an overall measurement. It is possible to use both the information obtained in relation to the object shape and the measured surface normals for the purpose of correct combination.

It is indispensable to calibrate the system as accurately as possible so that the surface 3 is also found with satisfactory accuracy. The calibration of the system can be broken down into three steps: the calibration of the screen, the calibration of the cameras and the calibration of the geometry of the overall system. The calibration of the screen permits every point of the patterns to be assigned a defined location on the screen. The calibration can be performed, for example, by a precise perforated mask that is positioned at the location of the ground glass screen. The pattern is measured in the holes whose position is known. The assignment of pattern and screen is defined thereby. The calibration of the cameras can be performed by known photogrammetric methods (bundle adjustment). The calibration of the cameras is simplified if use is made of telecentric objectives for imaging. The result of calibrating the cameras is that each point in the image plane of the camera is assigned a line of sight in the camera coordinate system. The third step of the calibration combines the coordinate systems of the screen and of the cameras into a world coordinate system. The calibration operation can be carried out with the aid of plane mirror with applied marks that is placed in the measuring space. The position of the cameras can be determined by resection with reference to the marks. The position of the ground glass screen can be determined, in turn, by resection with reference to the calibrated patterns that are reflected by the known specular surfaces.

The use of more than two cameras results in over determination of the system of equations for determining the calibration parameters of the overall system (pattern distortion, objective distortion, position of the cameras and of the screen). Self-calibration methods can be applied in this case. The calibration is rendered more robust by the use of telecentric observation.

It must be stressed that this method requires no diffusely scattering marks on or next to the object. A reflecting freeform surface can be placed freely in the measuring space and measured. If diffusely scattering marks, or other marks that can be detected in images of intensity, phase, contrast or uncalibrated inclination are present, known methods for the triangulation of the height can be used in support. Further surface points can be found in accordance with the above-described method starting from these triangulated points. It is also possible to determine the local height of the surface at suitable interpolation points by use of mechanical stops or feelers.

Many surface defects are clearly to be identified in the contrast image, in particular, which arises as a byproduct during the phase evaluation of sinusoidal patterns. The contrast image is a measure of the modulation in the images of the displaced reflected patterns. In addition to scratches, dust, dirt or fingerprints, the detectable defects also include, for example, artificially applied engravings or stamps. The contrast image can therefore also be used to carry out a "cosmetic" inspection of the surface in parallel with measurement of the surface.

This application claims the priority, under 35 U.S.C. § 119, of German patent application No. 10 2004 020 419.5, filed Apr. 23, 2004; the entire disclosure of the prior application is herewith incorporated by reference.

We claim:

1. A method for measuring a shape and a local surface normal of a specularly reflecting surface, which comprises the steps of:
   generating a pattern and displaying the pattern in a vicinity of the specularly reflecting surface;
   observing and recording images of a mirrored pattern reflected from the surface for at least two observation directions;
   determining for arbitrary points in space from each of at least two of the images, associated potential normals that would satisfy the law of reflection if the surface were located at said arbitrary points in space; and
   determining an actual shape and actual local surface normals from those arbitrary points in space where all associated potential normals are equal, except for measuring errors.

2. The method according to claim 1, which further comprises performing the recording step sequentially between the observation directions.

3. The method according to claim 1, which further comprises performing the recording step simultaneously from a number of the observation directions.

4. The method according to claim 1, which further comprises recording a number of images of various patterns from each of the observation directions and determining the associated potential surface normals therefrom.

5. The method according to claim 1, wherein a determination of the potential surface normals begins with the arbitrary spatial points from a small region of space until a first surface point is found, and in that an attempt is made to find further surface points iteratively with an aid of a surface normal, starting from the first surface point.

6. The method according to claim 5, which further comprises performing a determination of the further surface points by interpolation over a number of spatial points.

7. The method according to claim 1, which further comprises selecting a number and an orientation of the observation directions such that images of the patterns reflected can be recorded in various subareas of the surface from in each case at least two observation directions.

8. The method according to claim 1, which further comprises carrying out a number of measurements successively in which the surface is moved such that subareas of the surface can be measured successively.

9. The method according to claim 8, which further comprises combining measurements of a number of the subareas of the surface to form a common measured surface.

10. An apparatus for determining a shape and local surface normals of a specularly reflecting surface of an object, the apparatus comprising:
    means for generating a pattern and for displaying the pattern in a location suitable for causing a mirrored reflection of the pattern on the surface;
    at least two cameras for recording images of the mirror-reflected pattern, said cameras having optical axes directed from various directions onto the specular surface;
    an electronic computer connected to said cameras and said means, said electronic computer evaluating the images by determining for arbitrary points in space from at least two of the images associated potential surface normals that would satisfy the law of reflection if the surface were located at the arbitrary points in space, and determining an actual shape and actual local surface normals from those arbitrary points in space at which potential surface normals correspond except for measuring errors.

11. The apparatus according to claim 10, wherein said cameras are electronic cameras.

12. The apparatus according to claim 10, wherein said means generates and observes multiple patterns with varying displacement.

13. The apparatus according to claim 10, wherein said means generates various patterns for observation by said cameras.

14. The apparatus according to claim 10, further comprising a scattering screen, said means projecting the patterns onto said scattering screen and can be observed in transmitted light.

15. The apparatus according to claim 10, further comprising a reflecting screen, said means projecting the patterns onto said reflecting screen and are observed in diffuse scattering.

16. The apparatus according to claim 14, wherein said scattering screen is cambered for measuring strongly curved objects.

17. The apparatus according to claim 10, wherein said means electronically controls the patterns.

18. The apparatus according to claim 10, wherein said means produces the patterns with a sinusoidal intensity profile.

19. The apparatus according to claim 10, further comprising an object holder with which the surface can be positioned such that various subareas of the surface can be measured successively.

20. An apparatus for determining a shape and local surface normals of a specular surface of an object, the apparatus comprising:
    means for generating a pattern and for displaying the pattern in a location suitable for causing a reflection of the pattern on the specular surface;
    at least one camera;
    a device for moving said camera and for varying an observation direction of said camera so that images of reflected patterns can be recorded from various directions in relation to the specular surface;
    an electronic computer connected to said means and said camera, said electronic computer evaluating the images by determining for arbitrary spatial points from at least two of the images associated potential surface normals with an aid of reflection law for a surface point potentially situated there, and determining an actual shape and actual local surface normals by a set of spatial points thus treated, at which potential surface normals correspond except for measuring errors.

21. The apparatus according to claim 20, wherein said camera is an electronic camera.

22. The apparatus according to claim 20, wherein said pattern- generating means generates and observes multiple patterns with varying displacement.

23. The apparatus according to claim 20, wherein said means generates various patterns that can be observed.

24. The apparatus according to claim 20, further comprising a scattering screen, said means projecting the patterns onto said scattering screen and can be observed in transmitted light.

25. The apparatus according to claim 20, further comprising a reflecting screen, said means projecting the patterns onto said reflecting screen and are observed in diffuse scattering.

26. The apparatus according to claim 24, wherein said scattering screen is cambered for measuring strongly curved objects.

27. The apparatus according to claim 20, wherein said means electronically controls the patterns.

28. The apparatus according to claim 20, wherein said means produces the patterns with a sinusoidal intensity profile.

29. The apparatus according to claim 20, further comprising an object holder with which the surface can be positioned such that various subareas of the surface can be measured successively.

* * * * *